(12) United States Patent
Herrmann

(10) Patent No.: US 10,225,696 B2
(45) Date of Patent: Mar. 5, 2019

(54) FEEDBACK SIGNALING FOR MULTICAST DATA TRANSMISSION

(71) Applicant: KONINKLIJKE PHILIPS N.V., Eindhoven (NL)

(72) Inventor: Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/699,550

(22) Filed: Sep. 8, 2017

(65) Prior Publication Data

US 2018/0014163 A1    Jan. 11, 2018

Related U.S. Application Data

(63) Continuation-in-part of application No. 14/218,396, filed on Mar. 18, 2014, now Pat. No. 9,775,005,
(Continued)

(30) Foreign Application Priority Data

Aug. 15, 2003  (EP) ..................................... 03102563
Apr. 6, 2004   (GB) ................................... 0407902.6

(51) Int. Cl.
*H04W 4/06*    (2009.01)
*H04L 1/18*    (2006.01)
(Continued)

(52) U.S. Cl.
CPC ............. *H04W 4/06* (2013.01); *H04L 1/1607* (2013.01); *H04L 1/1692* (2013.01);
(Continued)

(58) Field of Classification Search
None
See application file for complete search history.

(56) References Cited

U.S. PATENT DOCUMENTS 5,457,808 A    10/1995  Osawa
6,044,069 A     3/2000  Wan
(Continued)

FOREIGN PATENT DOCUMENTS

EP    1063782 A2    12/2000

OTHER PUBLICATIONS

Inoue et al, "Reliable Multicast Protocol With a Representative Acknowledgment Scheme for Wireless Systems", IEICE Transactions on Communications, Institute of Electronics Information and Comm. Eng., Tokyo, JP, vol. E84-B, No. 4, Apr. 2001, pp. 853-862; XP001058874.
(Continued)

*Primary Examiner* — Hong S Cho

(57) ABSTRACT

Data transmission in a multicast fashion in which retransmissions are requested by recipients sending feedback to the one sender. Receiving stations are informed about the feedback of another receiving station. This is done by mirroring the feedback of receiving stations to other receiving stations. Due to this, in case, for example, one of the mirrored feedbacks is a negative acknowledgement message, the other receiving stations are informed that it is no longer necessary to provide their feedback, since a retransmission will be initiated anyway. Advantageously, this may allow reduced interference in the direction of the feedback

17 Claims, 4 Drawing Sheets

Related U.S. Application Data which is a continuation of application No. 10/568,015, filed as application No. PCT/IB2004/002640 on Aug. 4, 2004, now Pat. No. 8,675,616.

(51) Int. Cl.
*H04W 52/48* (2009.01)
*H04L 12/18* (2006.01)
*H04L 1/16* (2006.01)
*H04L 1/00* (2006.01)
*H04W 52/36* (2009.01)
*H04W 76/40* (2018.01)

(52) U.S. Cl.
CPC .......... *H04L 1/1887* (2013.01); *H04L 1/1896* (2013.01); *H04L 12/1868* (2013.01); *H04W 52/48* (2013.01); *H04L 12/189* (2013.01); *H04L 2001/0093* (2013.01); *H04W 52/36* (2013.01); *H04W 76/40* (2018.02)

(56) References Cited

U.S. PATENT DOCUMENTS

| | | | |
|---|---|---|---|
| 6,392,993 | B1 | 5/2002 | Hamilton |
| 6,611,692 | B2 | 8/2003 | Raffel |
| 6,728,226 | B1 | 4/2004 | Naito |
| 6,959,199 | B2 | 10/2005 | Ohkubo |
| 6,996,410 | B2 | 2/2006 | Bos |
| 7,130,282 | B2 | 10/2006 | Black |
| 7,203,512 | B2 | 4/2007 | Jeong |
| 2002/0028687 | A1 | 3/2002 | Sato |
| 2002/0102999 | A1 | 8/2002 | Maggenti |
| 2002/0133615 | A1 | 9/2002 | Satran |
| 2003/0157933 | A1 | 8/2003 | Watanabe |
| 2003/0207696 | A1 | 11/2003 | Willenegger |
| 2004/0128454 | A1 | 7/2004 | Altahan |
| 2005/0002365 | A1 | 1/2005 | Xu |
| 2006/0274780 | A1 | 12/2006 | Walsh |

OTHER PUBLICATIONS

Levine et al, "A Comparison of Known Classes of Reliable Multicast Protocols", Network Protocols, 1996, Los Alamitos, CA, IEEE Comput. Soc., Oct. 29, 1996, pp. 112-121, XP010204425.

International Search Report of International Application No. PCT/IB2004/002640 Contained in Iternational Publication No. WO2005018144.

Wriitten Opinion of the International Searching Authority for International Application No. PCT/IB2004/002640.

Qualcomm Europe, "Outer Coding for MBMS", EGPP TSG-RAN2 Meeting #38, R2-032157, 2003, pp. 1-8.

Lucent Technologies, "Release 5+ MBMS Solution: HS-DSCH", 3GPP TSG-WGX#30, R1-030086, 2003, pp. 1-9.

FEEDBACK SIGNALING FOR MULTICAST DATA TRANSMISSION

This application claims the benefit or priority of and describes the relationships between the following applications: wherein this application is a continuation of U.S. patent application Ser. No. 14/218,396, filed on Mar. 18, 2014, which is a continuation of U.S. patent application Ser. No. 10/568,015, filed Feb. 10, 2006, now U.S. Pat. No. 8,675,616, issued on Mar. 18, 2014, which is the National Stage of International Application No. PCT/M2004/002640, filed Aug. 4, 2004, which claims the priority of foreign application GB 0407902.6 filed on Apr. 6, 2004 and EP03102563.8, filed on Aug. 15, 2003, all of which are incorporated herein in whole by reference.

The present invention relates to data transmission in a multicast fashion. In particular, the present invention relates to a method of performing a point-to-multipoint data transmission from a transmitting station to a plurality of receiving stations, a data transmission system for performing a point-to-multipoint data transmission from a transmission station to a plurality of receiving stations, to a transmitting station for a data transmission system for a point-to-multipoint data transmission from the transmission station to a plurality of receiving stations and to a receiving station for a data transmission system for a point-to-multipoint data transmission from a transmitting station to a plurality of receiving stations.

Data transmission in a multicast fashion usually causes difficulties when retransmissions of the data are applied in order to increase the chance of correct decoding for a maximum of the recipients, since each recipient has to send its feedback separately to one sender, which causes a huge amount of feedback signaling in case the multicast reception group is large. Multicast data transmission or point-to-multipoint data transmission relates to a data transmission where one sender once sends data, such as a data packet, to a number of recipients and each recipient decodes this (single physical representation of the) data.

If the same data is to be conveyed to a number of recipients, such as, for example, in the case of a base station of a mobile communication system via a wireless transmission channel to a number of recipients in a radio cell, it may be advantageous to send each packet only once to all recipients in a broadcast manner and let all recipients decode this one packet. In other words, on a physical level, only one point-to-multipoint channel (p2m) is used, as opposed to a plurality of point-to-point channels (p2p-channel) for each recipient individually. Usually, the data is transmitted in the form of data packets.

Possible approaches to improve the reliability of such data transmission are:
  forward error correction (FEC), which adds redundancy to the data bits of a data packet, so that the receiving side may detect and correct errors in a data packet
  retransmitting data packets on request of the receiving side, if the receiving side is not able to correct all errors contained in the received data packets. Such retransmissions can be either full copies of the initially transmitted packet, or a retransmission can contain different data, e.g. only additional parity bits, which together with the received bits of the initially transmitted packet are considered in the decoding process. To cover both cases, here the term "retransmission for a packet" instead of "retransmission of a packet" is used.

Both of the above approaches are usually applied when data packets are transmitted via a p2p channel.

For transmission via a p2m channel, the retransmission of data packets may be problematic, since each recipient has to send its feedback to the sender. Thus, the sender has to cope with as many feedback messages as there are recipients for each data packet transmitted. This may cause a huge amount of signaling in the direction from the recipient to the sender, if the number of recipients in the multicast group is large. Also, if at least one of the recipients asks for a retransmission, it is necessary to perform another point-to-multipoint transmission of the data, i.e. another transmission of the data to all of the recipients.

In other words, due to the large amount of signaling in the direction from the recipient to the sender, such known point-to-multipoint transmission occupies a lot of channel capacity in the direction from the recipient to the sender, and generates significant interference, and thus may be inefficient in case the number of recipients in the multicast group is large.

It is an object of the present invention to provide an efficient feedback signaling mechanism for point-to-multipoint data transmission.

According to a first exemplary embodiment of the present invention, the above object may be solved by a method of performing a point-to-multipoint data transmission from a transmission station to a plurality of first receiving stations, wherein the data is transmitted from the transmitting station to the plurality of first receiving stations. Then, at the transmitting station, a confirmation message with respect to the data is received from at least one second receiving station of the plurality of first receiving stations. The transmitting station transmits (possibly together with a further data packet) the confirmation message, which it received from the at least one second receiving station, to at least one third receiving station of the plurality of first receiving stations.

In other words, according to an aspect of this exemplary embodiment of the present invention, the confirmation message relating to the decoding of the data at the at least one second receiving station is mirrored by the transmitting station to at least one third station of the plurality of first receiving stations. Due to this, the at least one third receiving station is informed about the decoding result of the data at the at least one second receiving station. Due to this knowledge, advantageously, the at least one third receiving station may decide what to do next. According to an aspect of this exemplary embodiment of the present invention, the data may relate to user data transmitted via a data channel or to control data transmitted via a control channel.

In case the confirmation is a negative acknowledgement message indicating that the at least one second receiving station unsuccessfully decoded the data as set forth in a second exemplary embodiment of the present invention, the at least one third receiving station knows that a retransmission for the data packet may happen anyway, due to the fact that the at least one second receiving station was not be able to decode the data packet error-free. In such a case, according to an aspect of this exemplary embodiment of the present invention, the at least one third receiving station may decide not to perform a transmission of its own confirmation message relating to the own decoding of the data packet to the transmission station. Advantageously, this may allow for a reduction of feedback signaling.

On the other hand, in case, as set forth in the second exemplary embodiment of the present invention, the confirmation message is a positive acknowledgement message indicating that the data was decoded error-free, i.e. successfully at the at least one second receiving station, the at least one third receiving station may use this information to send its own confirmation message back to the transmitting station. Advantageously, according to this exemplary embodiment of the present invention, a needless feedback signaling of, for example, the positive or negative acknowledgement message from the at least one third receiving station in case the at least one second receiving station already sent a negative acknowledgement message, may be avoided. Due to this, the amount of signaling in the direction from the recipient to the sender, may be reduced, even if the number of recipients in the multicast group is large.

According to a third exemplary embodiment of the present invention, the transmitting station retransmits the data packet in case the confirmation message is a negative acknowledgement message. In other words, in case the at least one second receiving station was not able to decode the data packet error-free, the transmitting station initiates or starts a retransmission of the data packet without waiting for a feedback signaling of the other receiving stations in the multicast group.

Due to this, advantageously, since a retransmission for the data packet is anyway needed, this retransmission upon reception of a negative acknowledgement message allows to increase the efficiency of the data channel to the recipients, i.e. to reduce the transmission delay, since it is not necessary to wait with the retransmission until the last receiving station sent its feedback, and to increase the data transmission rate to receiving stations with only limited memory. Furthermore, due to the fact that the retransmission of the data is performed immediately after reception of a negative acknowledgement message from one receiving station in the multicast group, the further confirmation messages from the other receiving stations do not need to be taken into account, i.e. may be ignored at the transmitting station, since the retransmission is performed anyway.

Due to this, advantageously, the transmission delay and data transmission rate to the recipients with limited memory may be increased and the amount of confirmation messages to be decoded by the transmitting station may be reduced.

According to a fourth exemplary embodiment of the present invention, the plurality of first receiving stations is grouped into a plurality of groups or subsets, wherein a feedback phase is assigned to each of the groups. Thus, the receiving stations of a group are scheduled to send their confirmation messages to the transmitting station at a pre-set feedback phase. In other words, the group of receiving stations transmit their confirmation messages in accordance with the feedback phase defined for this group.

In other words, according to this exemplary embodiment of the present invention, the set of recipients is split up into separate or disjoint subsets, whereby the members of each subset are assigned a pre-defined phase, for example, within the radio frame, which determines the structure of up-link and down-link transmissions in which phase the members of the subsets are allowed to transmit their confirmation messages. According to an aspect of this exemplary embodiment of the present invention, this feedback phase may also be a pre-defined slot or sub-frame in the up-link p2m control channel, which may accompany the data transmission via the p2m data channel.

Due to the prescribed feedback scheme, the transmission station "knows" at what phase, time, slot or channel the confirmation or feedback from the receiving stations of a group or subset is to be expected relative to the transmission of a data packet.

According to a fifth exemplary embodiment of the present invention, the feedback scheme is adapted such that the confirmation message of the first group or subset is decoded and mirrored back to the second group before the transmission of the confirmation message of the second group starts. By this, advantageously, it may be ensured that the second group "knows" about the feedback of the first group and thus may decide to skip its own feedback, i.e. the sending of its own confirmation message.

Due to this, advantageously, the amount of signaling from the receiving stations to the transmitting stations may be reduced, which may allow to reduce interferences occurring in the channel to the transmitting station. Apart from this the receiving station may save battery energy.

According to a sixth exemplary embodiment of the present invention, the at least one fourth receiving station of the second group does not send its own negative acknowledgement message in the case of an unsuccessful decoding, if it received a negative acknowledgement message mirrored by the transmitting station indicating that the at least one third receiving station of the first group was not able to decode the data packet error-free.

According to a seventh exemplary embodiment of the present invention, the receiving stations of the multicast group only send the confirmation message in case the decoding of the data packet is unsuccessful, i.e. only send a negative acknowledgement message.

Advantageously, this may allow to further reduce the amount of signaling between the recipients and the sender.

According to an eighth exemplary embodiment of the present invention, after a retransmission of the data, the transmission station listens only to confirmation messages of groups of the receiving stations which have not yet sent a positive acknowledgement message with respect to the data. In other words, after retransmission, the transmitting station only waits for a feedback of groups of receiving stations which have either already sent a negative acknowledgement message or did not send a positive acknowledgement message, due to the fact that other groups sent a negative acknowledgement message before them, so that they received a mirrored copy of the negative confirmation message of another group before they were scheduled to send their own confirmation and decided not to send their own confirmation message.

According to a ninth exemplary embodiment of the present invention, the receiving stations are adapted such that only negative acknowledgement messages are sent to the transmitting station and the transmitting station initiates a retransmission of the data upon reception and decoding of the confirmation message. According to an aspect of this exemplary embodiment of the present invention, the transmitting station initiates a retransmission for a data packet upon reception and decoding of the first negative acknowledgement message from a receiving station or subset of receiving stations.

Advantageously, this may allow for a robust and efficient operation, while keeping the amount of signaling from the recipients to the sender low.

According to a tenth exemplary embodiment of the present invention, the transmitting stations are adapted to only send positive acknowledgement messages, indicating that the receiving station has decoded the data packet error-free. Then, the transmitting station initiates a retransmission for the data packet after not receiving a positive acknowledgement message from at least one receiving station.

Advantageously, this may allow to reduce the up-link interference (from the receiving stations to the transmitting stations), if only a few retransmissions are necessary. Thus, advantageously, this may allow to reduce the up-link interference in case of good reception conditions.

According to an eleventh exemplary embodiment of the present invention, the method is applied in the context of Multimedia Broadcast Multicast Services (in the following referred to as "MBMS") in the Universal Mobile Telecommunication System (UMTS). Advantageously, this may allow for an efficient feedback signaling in UMTS radio cells via the UMTS radio interface.

According to a twelfth exemplary embodiment of the present invention, the confirmation message comprises confirmation data in form of soft bits and a soft-combining of the confirmation message of the at least one third receiving station of the first group with the confirmation message of the at least one fourth receiving station of the second group is performed.

Advantageously, according to this exemplary embodiment of the present invention, confirmation messages or confirmation signals of different senders are combined, e.g. in the transmitting station, therefore allowing for a detection of a confirmation signal which has been sent with insufficient transmission power in some or all of the different senders of a confirmation signal referring to the same downlink data transmission via the p2m data channel.

According to a thirteenth exemplary embodiment of the present invention, a fifth receiving station of the plurality of first receiving stations determines a fourth group of the plurality of groups of first receiving stations to which the fifth receiving station assigns itself after receiving information about the number of groups of the first receiving stations available for grouping. Advantageously, according to this exemplary embodiment of the present invention, the determination of the fourth group to which the fifth receiving station belongs is performed by the fifth receiving station without additional signaling, therefore reducing the amount of uplink signaling.

According to a fourteenth exemplary embodiment of the present invention, the determination of the fourth group to which the fifth receiving station belongs is performed on the basis of at least one of a random number generated by the fifth receiving station, a modulo operation applied to one of an International Mobile Subscriber Identity (IMSI) and a Temporary Mobile Subscriber Identity (TMSI) of the fifth receiving station, and a path loss figure perceived during the data transmission on the p2m channel.

Advantageously, this may provide for an internal assignment of the receiving stations to the different groups without additional downlink traffic.

According to a fifteenth exemplary embodiment of the present invention, the confirmation message is transmitted to the transmitting station from at least one sixth receiving station of the plurality of first receiving stations with a first transmission power, wherein, when a minimum number of sixth receiving stations transmits the confirmation message in accordance with a third feedback phase, which is in accordance with a feedback scheme, resulting in a superposition of confirmation messages and therefore in an increase of power received at the transmitting station, the received power at the transmitting station is sufficient for decoding the superposition of confirmation messages. On the other hand, when less than a minimum number of sixth receiving stations transmit the confirmation message in accordance with the third feedback phase, the received power at the transmitting station is not sufficient for decoding the superposition of confirmation messages.

Advantageously, by setting the first transmission power below a certain value, only a superposition of a plurality of confirmation messages may be decoded in the transmitting station successfully. If, for example, only one confirmation message is sent, the transmitted power may not be sufficient for successful decoding. Therefore, according to this exemplary embodiment of the present invention, by reducing the transmission power for transmitting confirmation messages via the uplink, a filter may be introduced which blocks retransmission of downlink data, since only a few or too few (e.g. only one) receiving stations send a confirmation message.

According to a sixteenth exemplary embodiment of the present invention, after the at least one third receiving station has sent the confirmation message with a second transmission power to the transmitting station in accordance with the first feedback phase, it sends the confirmation message in accordance with the second feedback phase and with a third transmission power, wherein the third transmission power is higher than the second transmission power.

Advantageously, this may allow for a power ramping of the confirmation message transmission.

According to a seventeenth exemplary embodiment of the present invention, the data is sent as a data packet and the method is a retransmission protocol in a cellular radio communication system, such as, for example, a Global System for Mobile Communication (GSM) mobile telecommunication system or the UMTS telecommunication system.

According to an eighteenth exemplary embodiment of the present invention, a data transmission system is provided for a point-to-multipoint data transmission from a transmission station to a plurality of first receiving stations, where the transmitting station is adapted to transmit a confirmation message with respect to the data from at least one second receiving station of the plurality of first receiving stations to at least one third receiving station of the plurality of first receiving stations.

Advantageously, due to the mirroring of the confirmation message from a receiving station to another receiving station, the other receiving stations are informed about a feedback of other receiving stations. This may allow a reduction in feedback signaling, i.e. a transmission of confirmation messages from the receiving stations to the transmitting stations.

According to a nineteenth exemplary embodiment of the data transmission system of the present invention, the receiving stations are grouped into groups or subsets, wherein the members of each group or subset are assigned a pre-defined feedback phase, which, according to an aspect of this exemplary embodiment of the present invention, determines the structure of up-link and down-link transmissions, in which phase the members of the group or subset are allowed or scheduled to transmit their respective confirmation messages. In this context, it should be understood that the feedback phase does not relate to a particular phase, but is to be understood as a particular point in time, time slot, transmission channel or sub-frame (relative to the transmission time, time slot or sub-frame, when a data packet is transmitted) in the up-link or down-link p2m control channel, which, according to an aspect of the present invention, accompanies the transmission of a data packet.

According to a twentieth exemplary embodiment, when the confirmation message from the at least one third receiving station of the first group is the negative acknowledgement message indicating that one or more of the at least one third receiving station unsuccessfully decoded the data, the at least one fourth receiving station of the second group is adapted to not send the confirmation message.

According to a twenty first exemplary embodiment, the at least one third receiving station and the at least one fourth receiving station only send the confirmation message in case the decoding of the data at the at least one third receiving station and at the at least one fourth receiving station is unsuccessful such that the at least one third receiving station and the at least one fourth receiving station only send the negative acknowledgement message indicating that the data could not be decoded error-free.

According to a twenty second exemplary embodiment of the present invention, a transmission station for a data transmission system for a point-to-multipoint data transmission from a transmission station to a plurality of receiving stations is provided. According to this exemplary embodiment of the present invention, the transmitting station is adapted to send a confirmation message received from one receiving station to another receiving station.

According to a twenty third exemplary embodiment of the present invention, a receiving station is provided for a data transmission system for a point-to-multipoint data transmission from a transmitting station to a plurality of receiving stations. The receiving station is adapted to receive a confirmation message from another receiving station, which was sent from the transmitting station to the receiving station.

It may be seen as the gist of a twenty fourth exemplary embodiment of the present invention that the set of recipients of a multicast group is split up into separate or disjoint subsets, whereby the members of each subset are assigned, relative to the transmission of a data packet, a pre-defined phase within the radio frame, which determines the structure of up-link and down-link transmissions in which phase the members of the subset are allowed to transmit their feedback signals. According to an aspect of the present invention, use is made of the fact that in most cases there are already subsets for which the transmitting station has already received the subset feedback. This already received subset feedback is sent by the transmitting station to the "unfinished subsets with respect to the packet the feedback refers to", i.e. the subsets of receiving stations, which have not yet sent their feedback to the transmitting stations for this packet. In the following to denote this, also the expression "unfinished subset of a data packet" is used. Advantageously, this may reduce the amount of signaling in the direction from the recipients to the sender, i.e. from the receiving stations to the transmitting station.

These and other aspects of the present invention will become apparent from and elucidated with reference to the embodiments described hereinafter.

Exemplary embodiments of the present invention will be described in the following, with reference to the following drawings.

Figure 1:
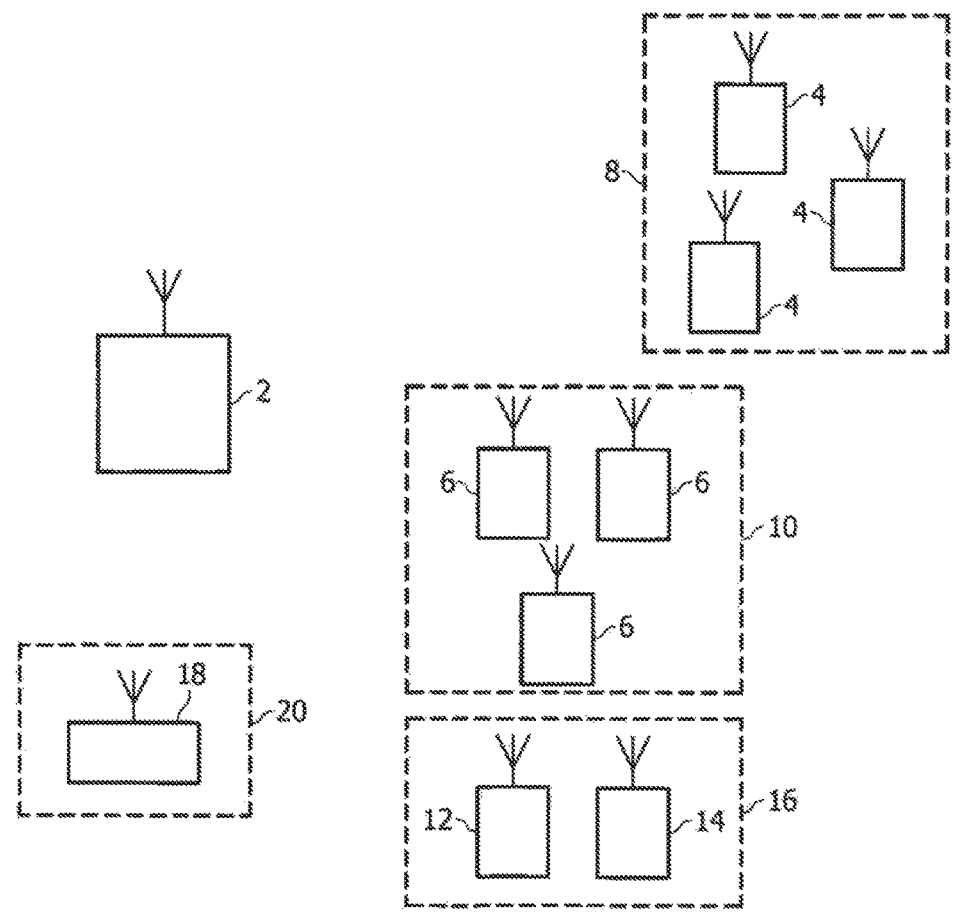
FIG. 1 shows a simplified representation of an exemplary embodiment of a data transmission system for a point-to-multipoint data transmission from a transmission station to a plurality of receiving stations according to the present invention.

FIG. 1 shows a simplified representation of a data transmission system for a point-to-multipoint data transmission, from a transmitting station 2 to a plurality of receiving stations 4, 6, 12, 14 and 18. The data transmission system depicted in FIG. 1 is a wireless data transmission system, where data is transmitted from the transmitting station 2 via a wireless radio link in the form of data packets to the receiving stations 4, 6, 12, 14 and 18. The data transmission system depicted in FIG. 1 may, for example, be a cellular mobile radio telecommunication system, such as the GSM system or the UMTS system, or a wireless local area network.

The transmitting station 2 depicted in FIG. 1 is adapted to transmit data in the form of a data packet to the plurality of receiving stations 4, 6, 12, 14 and 18. Each of the plurality of receiving stations 4, 6, 12, 14 and 18 is adapted to send a confirmation message back to the transmitting station. These confirmation messages relate to a decoding of the data at the respective receiving station of the plurality of receiving stations 4, 6, 12, 14 and 18. The transmitting station 2 is furthermore adapted to transmit the at least one confirmation message received from one of the receiving stations 4, 6, 12, 14 and 18 back to the receiving stations 4, 6, 12, 14 and 18.

As may be taken from FIG. 1, the receiving stations 4, 6, 12, 14 and 18 are grouped into four subsets 8, 10, 16 and 20, such that the receiving stations designated by reference numeral 4 are located or belong to the subset 8, the receiving stations designated by reference numeral 6 are located or belong to the subset 10, the receiving stations 12 and 14 belong to subset 16 and the receiving station 18 belongs to subset 20.

In the data transmission system depicted in FIG. 1 there is a feedback scheme according to which a first feedback phase is assigned to subset 8 and a second feedback phase is assigned to subset 10. In other words, the receiving stations 4 in the subset 8 are all assigned a first feedback phase, during which or via which they are scheduled to transmit their confirmation message, i.e. feedback messages back to the transmitting station 2. This can mean that the feedback messages are sent one after the other during this feedback phase exclusively assigned to the subset, i.e. in a time division manner, or superimposed during the feedback phase, in which case the phase is usually shorter. Superposition can be advantageously been done by using Code Division Multiple Access (CDMA) techniques. It is, however, also possible to superimpose without applying CDMA, in which case the feedback signals collide. If only Negative Acknowledgements are sent, this collision does not pose a problem for the transmission side to detect that at least one receiving station requested a retransmission by means of a Negative Acknowledgement (NACK). Also, each of the receiving stations 6, 12, 16 and 18 of the subsets 10, 16 and 18 are assigned another feedback phase, during which, at which or via which they may send their confirmation messages back to the transmitting station 2.

In other words, as may be taken from FIG. 1, the set of receiving stations 4, 6, 12, 14 and 18 is split up into separated subsets 8, 10, 16 and 20, whereby the members of each subset 8, 10, 16 and 20 are assigned a predefined feedback phase within the radio frame of the wireless communication channels between the transmitting station 2 and the receiving stations 4, 6, 12, 14 and 18, which determines the structure of up-link and down-link transmission, in which phase the members of the subsets 8, 10, 16 and 20 are allowed to transmit their feedback signals. The feedback signal or confirmation message is often also referred to as an ACK or NACK message. The ACK message is a positive acknowledgement message, which indicates that the data packet was decoded successfully without error at the respective receiving station 4, 6, 12, 16 and 18, whereas the NACK message is a negative acknowledgement message, which indicates that the receiving station sending this NACK message was not able to decode the respective data packet error-free, and therefore requests a retransmission. This phase of the feedback phase may also be looked upon as a pre-defined slot or sub-frame in the up-link or down-link p2m control channel, which accompanies the data packet transmission via the p2m data channel.

If the transmitting station hears at least one NACK in this phase or slot of the up-link control channel, it knows that a retransmission is required. Here, a subset-feedback is defined to be a NACK, whenever the transmitting station 2 receives at least one NACK from one receiving station of a respective subset. Accordingly, for example, the subset feedback of subset 16 is defined to be an ACK, if the transmitting station 2 receives an ACK from all receiving stations 12 and 14 in the subset 16.

In order to take advantage of the fact that in most cases there are subsets where the transmitting station 2 has already received the subset feedback for a particular packet (here called "finished subsets with respect to the packet", or "finished subsets of the packet", meaning that for the transmission of the considered data packet, they have finished conveying their feedback), and other subsets, whose receiving stations still have to send their feedback (here called "unfinished subsets with respect to the packet" or "unfinished subsets of the packet"), it may be advantageous to indicate the feedback of finished subsets to the unfinished subsets.

In other words, according to an aspect of this exemplary embodiment of the present invention, the feedback received from a receiving station is mirrored back to other receiving stations by the transmitting station, such that these other receiving stations are informed about the feedback. This information may be made such that the feedback of each of the receiving stations is mirrored to all of the other receiving stations. However, this feedback mirroring may also be performed such that the feedback of a subset is mirrored to other subsets, which have not yet sent their feedback.

Advantageously, according to an aspect of the present invention, the feedback of the last subset, which just became a finished subset, is sent back to the other subsets.

This indication of the subset feedback (preferably of the last subset, which has just sent its feedback), may be performed in a phase in the downlink frame structure or a slot of the down-link p2m control channel, shortly after the up-link phase in which the last subset sent its feedback. Indicating the subset feedback for a subset in the down-link may only require one single bit (in order to distinguish between ACK and NACK).

Thus, according to the present invention, at a given point in time, each unfinished subset is informed about the subset feedback of the subset that last sent its feedback to the transmitting station. If the subset feedback indicated to the unfinished subsets (via the pre-defined phase in the down-link frame structure after the transmitting station 2 has decoded the subset feedback of the last subset, which sent its feedback or confirmation message) is a NACK, then all members of the unfinished subsets know that a retransmission will occur anyway, so that there is no need to send the feedback, regardless of whether the own feedback is an ACK or an NACK message. Advantageously, due to the fact that the unfinished subsets know about the fact that a retransmission for the data packet will occur anyway, they may refrain from sending their own feedback, such that the amount of signaling from these subsets to the transmitting station 2 may be significantly reduced.

Advantageously, due to this, the up-link interference may be reduced.

Advantageously, the transmission station 2 is adapted such that the transmitting station may initiate a retransmission of the data packets as soon as it receives an NACK, i.e. a negative acknowledgement message from one receiving station or from a subset comprising a plurality of receiving stations. If the transmission station does not initiate a retransmission for a packet as soon as it receives a NACK from a subset of receiving stations, but continues transmitting new packets, it may be important that the receiving stations memorize the mirrored feedback for each received packet, in order to avoid needless feedback messages for packets, for which the mirrored feedback information already indicated that a retransmission will be initiated.

An alternative to this memorizing of feedback information of received packets, for which the transmitting station has not received the subset feedback of all subsets, is the following rule: For each packet, for which the transmitting station receives feedback information, the transmitting station indicates—in the next transmission on the down-link control channel, when the transmitting station is scheduled to indicate received feedback information for this packet to all receiving stations—
    a NACK, if the feedback information received so far for this packet was a NACK for at least one subset of receiving stations, and
    an ACK, if the feedback information received so far for this packet was an ACK for all of the receiving stations.

With this alternative, the receiving stations do not need to memorize the mirrored feedback information, and the transmitting station has the freedom not to initiate a retransmission for a packet as soon as it receives a NACK as subset feedback, but can initiate the retransmission also later on. If the retransmission is initiated as soon as the transmission station receives a NACK as subset feedback, this alternative becomes equivalent to the rule that the transmission station mirrors the subset feedback of the subset, that last sent its feedback.

With this alternative in mind, according to an aspect of the present invention, the current invention may also be looked upon as making the transmitting station indicate—based on subset feedback from the finished subsets of a packet—to the unfinished subsets of a packet, whether the transmitting station still intends to send a retransmission for this packet or not.

In the following, the four subsets 8, 10, 16 and 20 are considered in order to further explain the present invention. These four subsets 8, 10, 16 and 20 are configured to form a multicast group for receiving a point-to-multipoint (p2m) data transmission from the transmitting station 2 to the plurality of receiving stations 4, 6, 12 and 18. After a data packet transmission from the transmitting station 2, the transmitting station 2 waits for the subset feedback from the subsets 8, 10, 16 and 20. According to the present invention, the order of the feedback is prescribed by a feedback scheme. According to the feedback scheme of the data transmission system depicted in FIG. 1, the transmitting station 2 firstly waits for the subset feedback from subset 8, then from subset 10, then from subset 16 and then from subset 20.

In this context it should again be understood that a subset feedback relates to the confirmation messages sent from the receiving stations of each subset back to the transmitting station 2. In case one confirmation message sent by one receiving station of a plurality of receiving stations of a subset is a NACK, the subset feedback is considered to be a NACK. Only in the case that all confirmation messages from all receiving stations of a subset are positive acknowledgement messages ACK, is the subset feedback ACK.

For the feedback of each subset, the pre-defined phase in the up-link control channel between the transmitting station 2 and the respective receiving station of the receiving stations 4, 6, 12, 14 and 18 is left free, so that each member of the subset may convey its feedback. This phase may be made up of a number of time slots, or in a CDMA system, different channelization codes of the up-link control channel.

If the transmitting station 2 sends a package P1 and receives ACK as a subset feedback from subset 8, ACK as subset feedback for the subset 10 for P1 and then NACK as subset feedback from the subset 16, the transmitting station 2 may, directly after having decoded the NACK from the subset 16, initiate the retransmission for P1 without waiting for the subset feedback of the subset 20.

According to an aspect of the present invention, after this retransmission, the transmitting station 2 only waits for the subset feedback of those subsets which have not yet sent an ACK, i.e. in the present case for the subset feedback of the subset 16 and the subset 20. Subsets 8 and 10 do not send any feedback, i.e. confirmation messages, at this time, since they have already decoded P1 error-free, i.e. were able to decode P1 error-free as indicated by the earlier ACK transmissions from these subsets.

For this, it may be advantageous (in order to reduce the delay) to rearrange the up-link feedback phases for the subsets from which ACK have not yet been received, so that only these subsets send their feedback directly after retransmission. In other words, according to this aspect of the present invention, the feedback scheme may be adapted such that, for the retransmission, the feedback scheme assigns phases only to those subsets which have not yet sent an ACK.

This phase rearrangement in the feedback scheme may be indicated to the receiving stations via the down-link p2m control channel, which may control this retransmission protocol. The down-link p2m control channel may be forward error corrected (FEC), which, advantageously, allows that errors on this p2m control channel are extremely rare.

According to an aspect of the present invention, this down-link p2m control channel is advantageous also a p2m channel with no retransmission protocol on top, but a very strong FEC.

A link between the subset feedback and the transmitted data packet is, according to an aspect of the present invention, given by a pre-defined time difference between the point in time when the data packet being considered was sent, and the point in time when the respective subset sends its feedback. Also, the link between the subset feedback and the respectively transmitted packet may be given by a pre-defined time interval between the point in time when the packet was sent and the point in time when the base station indicated in the down-link frame (after the packet transmission) the subset feedback of the last subset which provided its feedback. In other words, the link may also be based on the time difference between the transmission of the respective data packet and the mirroring of the feedback from the last subset to send its feedback.

In case the down-link p2m control channel is adapted to have a strong FEC as set forth above, i.e. in case it can be assumed to a high probability that no receiving station will miss or unsuccessfully decode the down-link p2m control channel, the ACK feedback may be omitted. In other words, the receiving stations 4, 12, 14 and 18 may be adapted such that they only send a NACK, but not an ACK feedback as confirmation message. Thus, a receiving station 4, 6, 12, 14 and 18 of a subset, which has correctly decoded the data packet, does not send a confirmation message. Only the negative confirmation message, the NACK feedback message, is transmitted if a transmitting station of the subset cannot decode a received data packet. This operation mode, where instead of one of NACK or ACK is omitted, i.e. no energy is sent at all, may also be referred to as discontinuous transmission (DTX).

This may be particularly advantageous in combination with the strong FEC of the down-link p2m control channel according to which all receiving stations may at least receive the down-link p2m control channel error-free. Missing the down-link p2m control channel (i.e. not decoding it error-free or not even receiving sufficient energy on it) would mean (together with the definition of DTX as ACK, i.e. no ACK messages), that the transmitting station 2 erroneously assumes that a data packet was received by the receiving station, which missed the down-link p2m control channel, although the data packet was not received, not even decoded. Assuming that the transmitting station sends a continuous stream of packets (including retransmissions), a way out of the problem of missing the down-link p2m control channel is making the receiving station send a NACK also, if it misses the downlink control channel during the continuous stream of packets.

With this assumption, it is still possible that the transmitting station serves different multi-cast groups (which are each decomposed in different sub-sets), in that data transmission is done on a different channelization code or channelization code set for each of the multi-cast groups.

Advantageously, the omission of ACK messages, i.e. the definition of DTX as ACK may allow to reduce the up-link interference, i.e. the interference occurring in the transmission path from the receiving stations to the transmitting station, if only a few retransmissions are necessary, i.e. only a few NACKs are sent.

In contrast, according to another aspect of the present invention, if many retransmissions are necessary, it may be advantageous to define DTX as NACK, i.e. to adapt the receiving stations such that they only send an explicit ACK feedback and do not send any NACK confirmation messages. If decoding was not successful, according to this aspect of the present invention, the receiving stations will not send any feedback. In this case, missing the down-link p2m data channel does not cause any further problems, since the DTX (i.e. the missing NACK) is interpreted as an NACK by the transmitting station.

Hence, according to the present invention, the transmitting station may, depending on the current channel conditions, inform the transmitting stations via the down-link p2m control channel, whether DTX should mean ACK or NACK. According to an aspect of the present invention, ACK and NACK use different code words, so that the transmitting station receives an indication whether the receiving stations have understood that DTX means ACK (while there is a code word expressing NACK) or DTX means NACK (while there is a code word expressing ACK).

The most robust operation according to a preferred embodiment of the present invention is the case where DTX means no NACKs, which, however, causes considerable ACK feedback, if channel conditions are good, so that each transmission is acknowledged positively by each receiving station in each subset. In this mode, however, it is necessary that the base station may resolve those receiving stations in a subset which were not able to decode the packet error-free, i.e. in this case, each receiving station of each subset may have an exclusive time slot or channelization code assigned in accordance with the feedback scheme, to convey its ACK (or DTX).

In case DTX means ACK (i.e. no ACKs are sent; only NACKs are sent), it may be sufficient to provide exactly one time slot and channelization code to all receiving stations of a subset, since, as soon as one of the receiving stations of a subset needs a retransmission, it will generate and send a NACK, which then causes the subset feedback to become NACK. Since the transmitted energy of one or more NACK is superimposed, i.e. does not cause any interference so as to make the NACK unreadable for the transmitting station, this "one time slot and one channelization code" design may be sufficient. In other words, a collision of a plurality of NACKs in this one time slot or one channelization code design does not cause any problems for the transmitting station in detecting the correct subset feedback.

For the above described data transmission via the p2m channel with a retransmission protocol, it may be advantageous according to an aspect of the present invention, to apply a soft combination of earlier transmissions of a data packet and a further retransmission of this data packet. For example, the so-called Chase Combining may be applied. According to the Chase Combining, the soft-bits of a transmission are added to the soft bits of a previous transmission of the same packet, and then the decision is taken about whether each resulting soft-bit represents a logical "One" or a logical "Zero". Alternatively, the retransmission of self-decodable or non-self-decodable redundancy bits may also be possible.

Figure 2:
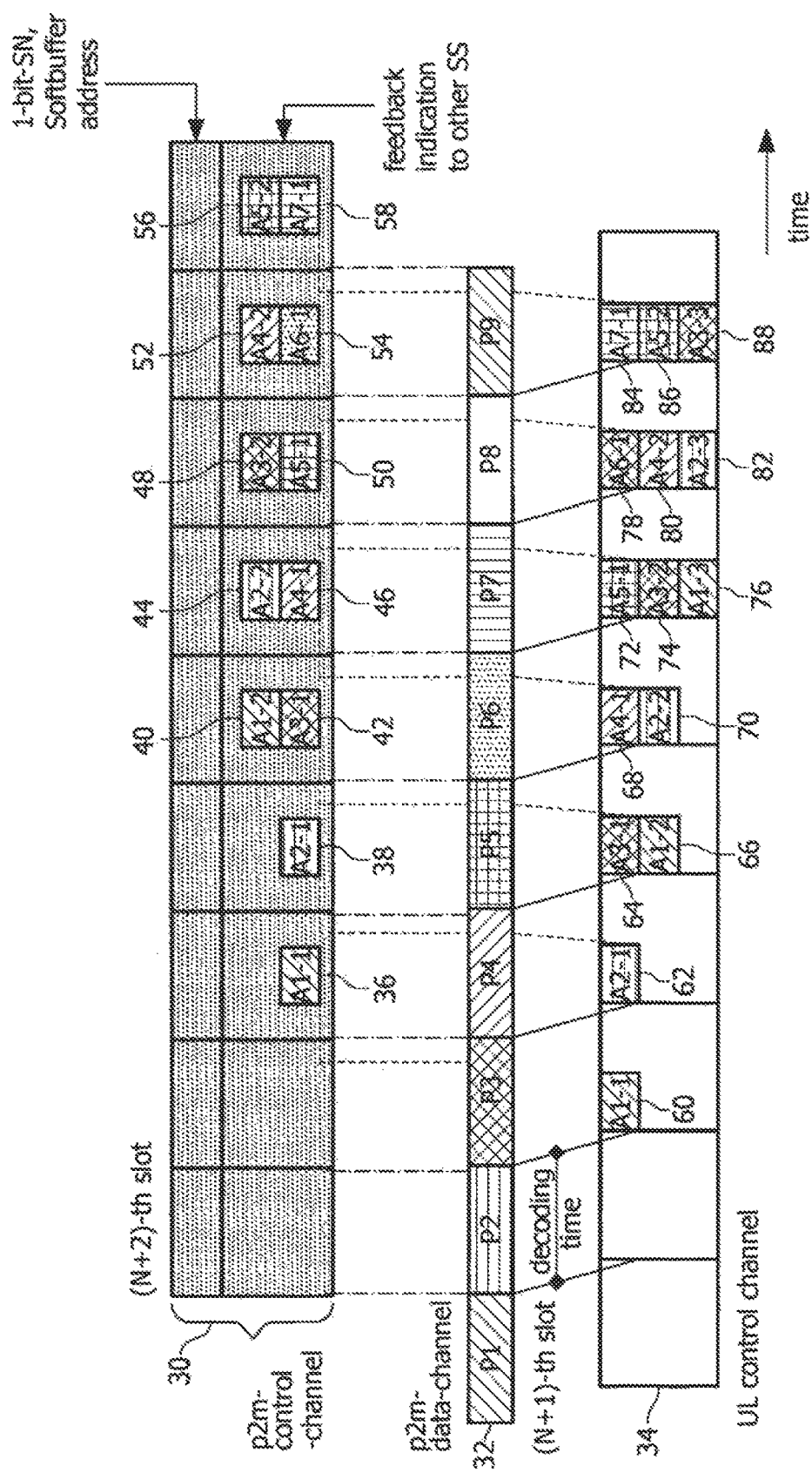
FIG. 2 shows an exemplary embodiment of a method of operating the data transmission system depicted in FIG. 1 according to the present invention.

FIG. 2 shows a timing chart of an exemplary embodiment of a method of operating a data transmission system according to the present invention. The timing charts depicted in FIG. 2 refer to a data transmission system including three subsets SS1, SS2 and SS3, each comprising one or more receiving stations.

The same numbering is assumed for the slots of the p2m data channel and the p2m control channel in FIG. 2.

The ACK messages are indicated with an "A" and the NACKs with an "N". The first number designates the serial number of the data packet, to which the feedback message refers, and the second number the serial number of the subset, to which the receiving stations belong, which send the feedback message.

Reference numeral 30 in FIG. 2 designates the p2m control channel from the transmitting station to the receiving stations. Reference numeral 32 designates the p2m data channel for transmitting the data packets from the transmitting station to the receiving stations, and reference numeral 34 designates the up-link (UL) control channel from the receiving stations to the transmitting station.

According to an aspect of the present invention, in order to avoid endless retransmissions for each data packet to be transmitted, a 1-bit sequence number (1-bit-SN) is introduced (indicated in the first line of chart 30) to indicate whether the data packet is a first transmission of new data or a retransmission. This 1-bit sequence number is sent as part of the p2m control channel. The initial transmission and subsequent retransmissions of the same packet use the same 1-bit sequence number, 1-bit-SN. A new transmission of the next data packet is indicated to the receiving stations by toggling the 1-bit sequence number compared with the previous transmission and by this toggling, an on-going transmission for a data packet can be stopped, in other words "be aborted".

In addition, the p2m control channel furthermore indicates to the recipients, the address of the soft buffer (the upper area of the p2m control channel includes the 1-bit SN and the soft buffer address) for which a transmission is planned, since several, i.e. $N_{slot}$ packets may be under transmission after each other, until all subsets have provided feedback to the transmitting station. According to an exemplary embodiment of the present invention, the soft buffer places may be numbered, where each number represents a soft buffer address. Ceil(log 2 ($N_{soft_buffer}$)) bits are needed on the p2m control channel to code all $N_{soft}$ buffer soft buffer places, where "Ceil(x)" denotes the smallest integer number, which is greater or equal to x, and log 2 is the logarithm with respect to the base of 2.

Since the sequence of data packets may change during transmission, according to an exemplary embodiment of the present invention, a packet sequence number (PSN) is sent as part of each packet ("in-band via the p2m data channel") in addition to the 1-bit SN sent on the p2m control channel so that the receiving stations may reconstruct the order of the data packets after decoding the data packets error-free.

The boxes 36 to 88 in the p2m control channel shown in timing chart 30 and in the UL control channel shown in timing chart 34 represent one bit for each subset SS1 to SS3. That means that if this bit is set, this may e.g. indicate to the receiving stations that the corresponding data packet was positively acknowledged by the last receiving subset feedback. The link with the data packet is given by the fixed relation between the slot in the p2m control channel (timing chart 30), in which this bit is conveyed, and the slot in the p2m data channel in which the data packet was sent.

As may be taken from FIG. 2, the data packet P1 is sent in the (N+1)-th slot of the p2m data channel (timing chart 32). Then, the decoding time necessary for the subset SS1 to decode P1 and send for each subset member the confirmation message contained in A1-1 (box 60), which depicts here the subset feedback, to the transmitting station is the length of one slot. Since the data packet P1 was decoded error-free by all receiving stations of the subset SS1, the subset feedback A1-1 is an ACK message. Then, as may be taken from FIG. 2, this positive decoding of data packet P1 by the subset SS1 is indicated to the other subsets in the (N+4)-th slot of the p2m control channel shown in timing chart 30, as indicated in FIG. 2 by box 36. Furthermore, the subset feedback A2-1 indicating an ACK message depicted by box 62 in the timing chart 34 indicating the error-free decoding (by all members of SS1) of the data packet P2 sent in (N+2)-th slot of the p2m data channel shown in timing chart 32 by the subset SS1, is indicated to the other subsets in the (N+5)-th slot of the p2m control channel shown in timing chart 30, as indicated by box 38.

Furthermore, the indication of correct decoding of the data packet P1 by the second subset SS2, derived from the subset feedback A1-2 indicating an ACK (box 66), which is sent in the (N+5)-th slot of the UL control channel shown in timing chart 34, is mirrored, i.e. indicated to the other subsets in the (N+6)-th slot (box 40) of the p2m control channel 30. Furthermore, the subset feedback, i.e. the ACK A1-3 (box 76) of the third subset SS3 is sent to the transmitting station in the (N+7)-th slot of the UL control channel shown in timing chart 34. Since there are only three subsets, there is no need to mirror the feedback of the third subset SS3, since this mirrored feedback is of no use for the other subsets.

The reason for the relatively long distance (in slots) between the transmission of the data packet P1 and the feedback indication in the p2m control channel is due to the time necessary for decoding the packet in each receiving station of each subset, as well as evaluating the received subset feedback in the transmitting station, as well as evaluating the feedback indication in each receiving station. Depending on the decoding speed in the receiving stations and the processing time required in the transmitting station to evaluate the subset feedback, this distance may also be smaller.

Since the feedback indication, i.e. the mirroring or signaling of the feedback or confirmation messages of receiving stations or subsets to other receiving stations or subsets is spread over as many slots of the p2m control channel as there are subsets in the multicast group, each slot of the p2m control channel has to accommodate several bits for the feedback indication, one for each subset.

As may be taken from FIG. 2, ("number of subsets"−1) bits are necessary; i.e., in FIG. 2, two bits are necessary for the mirroring of three subsets. Thus, the (N+6)-th slot of the p2m control channel shown in timing chart 30 carries one bit, i.e. box 42, which is the feedback indication mirroring the subset feedback ACK A3-1 of the first subset SS1 of receiving stations which received the data packets P3 in the ([N+6]−3)-th=(N+3)-th slot of the p2m data channel. Furthermore, the (N+6)-th slot of the p2m data channel carries a further bit, i.e. box 40, which is the feedback indication mirroring the subset feedback ACK A1-2 of the second subset of receiving stations, which received the data packet P1 in the ([N+6]−3−2)-th=(N+1)-th slot of the p2m data channel.

Since, in the exemplary embodiment depicted in FIG. 2, there are only three subsets, there is no need to monitor the subset feedback of the third subset, i.e. to indicate the subset feedback of the third subset SS3 to the other subsets via the p2m control channel. This is due to the fact that the third subset SS3 is the last subset to send its feedback, i.e. no other subset of the multicast group needs to know about the feedback of this subset SS3.

Figure 3:
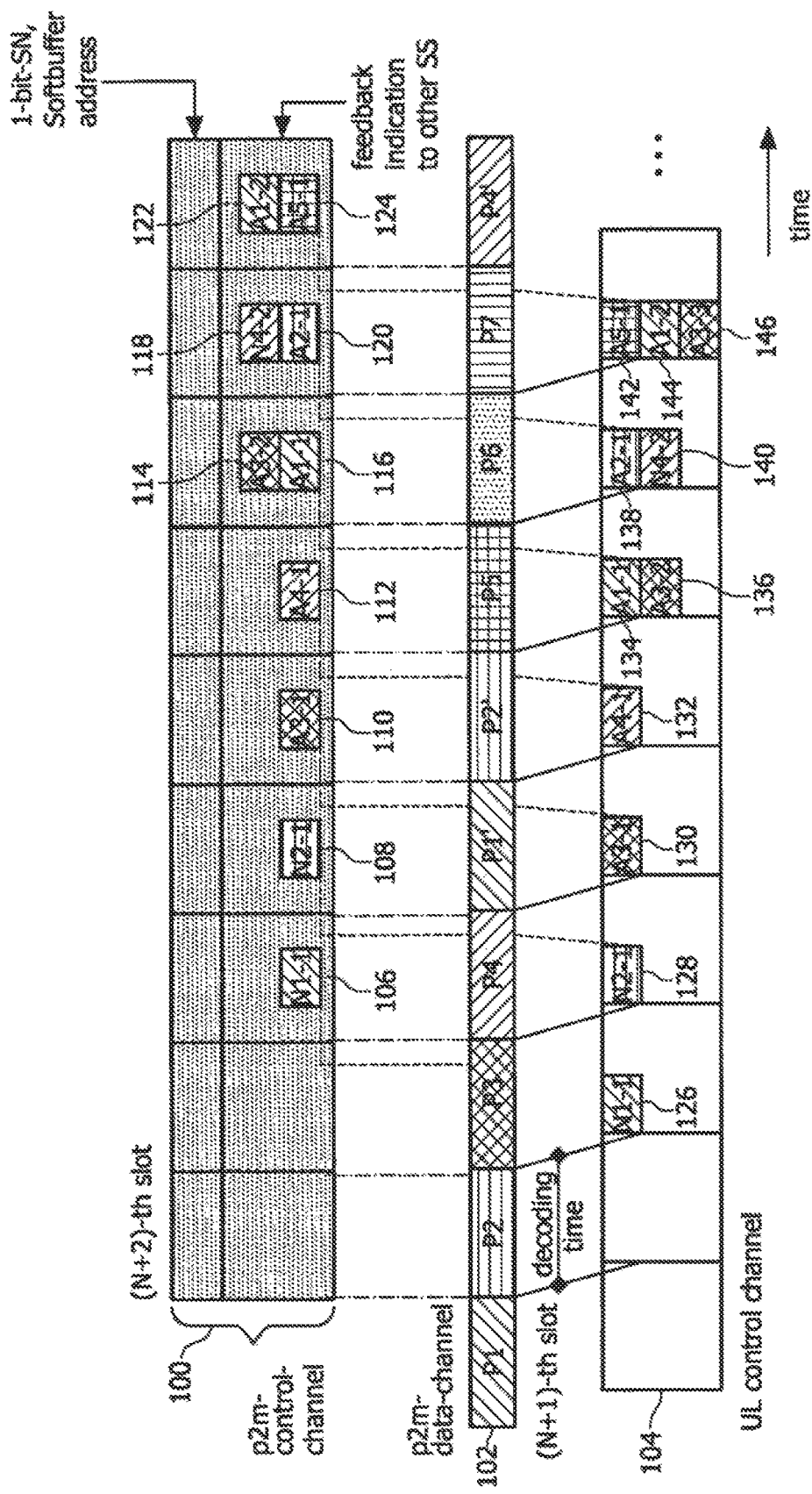
FIG. 3 shows another exemplary embodiment of a method of operating the data transmitting system depicted in FIG. 1 according to the present invention.

FIG. 3 shows timing charts of an exemplary embodiment of a method of operating a data transmission system according to the present invention, where data packets P1, P2 and P4 need retransmissions.

The channel structure depicted in FIG. 3 corresponds to the channel structure depicted in FIG. 2. Reference numeral 100 designates a timing chart depicting successive slots of the p2m control channel from the transmitting station to the receiving stations. As in FIG. 2, the first slot on the left side of the p2m control channel is the (N+2)-th slot. Towards the right side of FIG. 3, the slot number is incremented by 1. The upper area shaded in grey of the (sketchy representation of the) p2m control channel contains the 1-bit-SN and the soft buffer address and the lower area shaded in darker grey shows the indication portion or payload portion of each slot containing one bit (box 106 to 124) for each subset SS1 to SS3. However, it should be noted that, as in FIG. 2, a signaling for the respective last, i.e. third subset, i.e. the signaling of the confirmation message of the last, i.e. third unfinished subset is not necessary, i.e. ("number of subsets"−1) bits are sufficient.

Timing chart 102 shows the p2m data channel and the transmission of data packets P1 to P7 in the respective slots. Timing chart 104 shows the UL control channel from the receiving stations to the transmitting station. Since the channel structure depicted in FIG. 3 is the same as depicted in FIG. 2, reference is made to FIG. 2 for a further description of the channel structure. Also, as in FIG. 2, the multicast group for which the signaling is depicted in FIG. 3 contains three subsets SS1 to SS3.

The numbering of the slots is assumed to be the same for the p2m control channel, the p2m data channel and the UL control channel. As may be taken from timing chart 104, for each member of a subset two bits are necessary to report the decoding results from the receiving stations back to the transmitting stations. N1-1 (box 126), N2-1 (box 128) and N4-2 (box 140) represent the subset feedback, which is here NACK, from the receiving stations to the transmitting station. N1-1 represents the subset feedback (indicating NACK) of the first subset SS1 for the packet sent in the (N+1)-th slot, i.e. P1. N2-1 (box 128) is the subset feedback (indicating NACK) of the first subset SS1 for the packet sent in the (N+2)-th slot, i.e. P2. N4-2 (box 140) is the subset feedback (indicating NACK) of the second subset for the data packet P4 sent in the (N+4)-th slot of the p2m data channel. As in FIG. 2, the subset feedback indicating ACK are depicted with an "A" in the box (boxes 130, 132, 134, 136, 138, 142, 144, 146) whereas the subset feedback indicating NACKs are depicted by "N" (boxes 126, 128, 140). The first number in the boxes designates the number of the data packet to which this subset feedback refers and the second number indicates the subset SS1 to SS3 to which the subset feedback refers.

As may be taken from FIG. 3, two bits, i.e. ("number of subset"−1) bits are a sufficient payload size for the p2m control channel for a multicast group containing three subsets. As will be explained in the following, this number of feedback indication bits in the p2m control channel is even sufficient in the case that a retransmission of data packets is necessary.

As depicted in FIG. 3, the packet P1 sent in the (N+1)-th slot of the p2m data channel is unsuccessfully decoded by the first subset SS1, such that the NACK messages are sent from the members of the first subset to the transmitting station via the UL control channel. This is depicted by the subset feedback N1-1 (box 126) of the first subset to the transmitting station via the UL control channel. Then, after a certain time delay required for evaluating the subset feedback N1-1 (being a NACK) at the transmitting station, the transmitting station mirrors this NACK as N1-1 (box 106) to the other subsets and therewith to the other receiving stations in the (N+4)-th slot of the p2m control channel. Due to the subset feedback (box 126) indicating NACK in the (N+3)-rd slot of the UL control channel, the transmitting station retransmits the data packet P1 in the (N+5)-th slot of the p2m control channel, as indicated by P1\ In FIG. 3, retransmissions for a data packets are indicated by a "\". They can be exact copies of the initially transmitted packet (then they are called retransmissions of the packet), or can contain e.g. only additional parity bits (which covers the case of non-self-decodable incremental redundancy) or e.g. all systematic bits together with other parity bits compared with the initial transmission (which is a general example for the case of self-decodable redundancy).

Furthermore, the first bit, i.e. box 112 in the (N+7)-th slot of the p2m control channel, mirrors the subset feedback of the first subset SS1 for the packet P4 transmitted in the ([N+7]−3)-th=(N+4)-th slot of the p2m data channel. The second bit in the (N+7)-th slot of the p2m control channel would refer to the subset feedback of the second subset of receiving stations, which received the data packet transmission P2 in the ([N+7]−3−2)-th=(N+2)-th slot. Since, however, P2 is already retransmitted (P2') in the (N+6)-th slot, due to the fact that the first subset SS1 already indicated as subset feedback a NACK N2−1 (box 128) in the (N+4)-th slot of the UL control channel to the transmitting station, this second bit in the (N+7)-th slot of the p2m control channel has no meaning (therefore is not shown in the figure) and is thus ignored by the receiving stations, which are aware of the P2' retransmission.

It has to be noted that FIGS. 2 and 3 do not show that the p2m control channels may also carry information with respect to a redundancy version of a retransmission, if, for example, the Chase Combining (i.e. the retransmission for a data packet is an exact copy of the initial transmission) is not used, i.e. if self-decodable and non-self-decodable redundancy transmission schemes are applied.

In addition, in order to make the p2m control channels more strongly FEC protected, according to the present invention, they may also carry CRC (Cyclic Redundancy Check) bits, which are also not shown in FIGS. 2 and 3. Furthermore, the modulation and coding scheme may also be indicated via the p2m control channel to the receiving stations, if different modulation and/or coding schemes are to be applied, as well as an indication of the number of user-bits (i.e. uncoded), which are carried within one packet (so-called "transport block size"), so that the receiving side may derive from the number of coded bits it receives, which puncturing scheme was applied.

According to an aspect of this exemplary embodiment of the present invention, the mirrored subset feedback on the p2m control channel may be sent as the first part of the corresponding slot of the p2m control channel and may be protected with a separate CRC, different from the CRC of the other information carried on the p2m control channel, in order to allow for a very fast decoding of the subset feedback by the receiving stations without the other information carried on the p2m control channel. If CDMA technology is applied, this part of the p2m control information could also be sent on a different channelization code or code set.

According to an aspect of this exemplary embodiment of the present invention, if CDMA technology is applied and the number of channelization codes may be changed from one transmission to the next, an indication of the used channelization codes may also be carried out via the p2m control channel. If the p2m control channel is used for controlling transmissions to several multicast groups, wherein each multicast group is organized in different subsets, the p2m control channel may also contain an identification of the respective multicast group. Furthermore, according to a further exemplary embodiment of the present invention, it may be advantageous, especially for decoding purposes, to shift the p2m control channel in time with respect to the p2m data channel, so that information carried in a slot of the p2m control channel is available earlier than the data sent on the p2m data channel associated with the information in the slot of the p2m control channel. In such a case, the slots of the p2m control channel are shifted in time to the left side with respect to FIGS. 2 and 3.

The fact that it may take a number of slots until all groups have provided their feedback may require for a continuous stream of data packets via the air interface (in the case of a wireless data transmission) that the receiving stations or recipients are able to store a number of data packets, which might be out of sequence. In a best case, needing, however, a maximum memory, after transmission of a packet A, which is received by all transmitting stations error-free, as many further packets may be sent as slots ($N_{slot}$) are required, until all subsets have provided their ACK feedback for the packet A. If one of the subsets sends a NACK, this will cause a retransmission directly afterwards, i.e. whilst the slot is then used for retransmission, so that fewer packets than $N_{slot}$ have to be stored.

According to an aspect of the present invention, an improved delay reduction may be achieved, if the assignment of receiving stations to the subsets is performed in such a way that receiving stations which have a high likelihood of needing several retransmissions are within the same subset and/or within the first ones of the subsets scheduled to send their feedback to the transmitting station in accordance with the feedback scheme. Then, NACKs would be received at the earliest point in time, which allows that retransmissions may be initiated at the earliest possible point in time.

An assignment to the subsets could be done explicitly by means of a configuration message sent to each receiving station. For a huge number of receiving stations, this might not be feasible, and in such a case, according to an aspect of this exemplary embodiment of the present invention, the assignment may be done implicitly: For example, in the case of mobile phones, each mobile phone has a unique subscriber identity (IMSI: International Mobile Subscriber Identity). From its IMSI, each mobile phone may compute the subset to which it belongs, if it only knows the number of subsets which are to be configured. This number of subsets to be configured NSubsets, according to an aspect of the present invention, is indicated to the mobile phone (i.e. the receiving stations) e.g. via the p2m control channel, or even by a broadcast message sent over another downlink channel, and the respective subset for each mobile phone may then be computed by means of the following formula: NSubsets "Assigned subset"=IMSI mod NSubsets, Especially in large multicast groups, it has been found, according to the present invention, that it may be beneficial to accept that some of the transmitting stations finally may lose a data packet. This would result, if the subset feedback were defined to be only a NACK, if not only one but a number of recipients, pre-defined by a threshold, send a NACK in the phase reserved for feedback transmission for this subset. This means that only if the number of NACKs conveyed is larger than the threshold, the transmitting station or base station assumes that the subset feedback is a NACK and therefore initiates a retransmission. This, however, only works if DTX=ACK (only NACKs are sent).

According to a further aspect of this exemplary embodiment of the present invention, a further reduction of the up-link interference may be achieved, if only those recipients in a subset send their feedback, which have moderate or bad channel conditions, but not receiving stations which have good channel conditions. This may then be evaluated locally in each station, and each station itself would take the decision to send feedback or not. The alternative of conveying measurement results for the perceived channel conditions may be efficient in some cases.

According to a further aspect of the present invention, in a TDD (Time Division Duplexing) system, it may not be necessary to provide the feedback via the p2m control channel, since receiving stations may hear the up-link transmission of other stations, since up-link and down-link share the same frequency band, and hence may get to know the subset feedback by this means. However, even in such a case, it may be advantageous to let the transmission station or base station mirror the feedback, since it is not guaranteed that all receiving stations of the multicast group can hear all of the other members of the multicast group.

Figure 4:
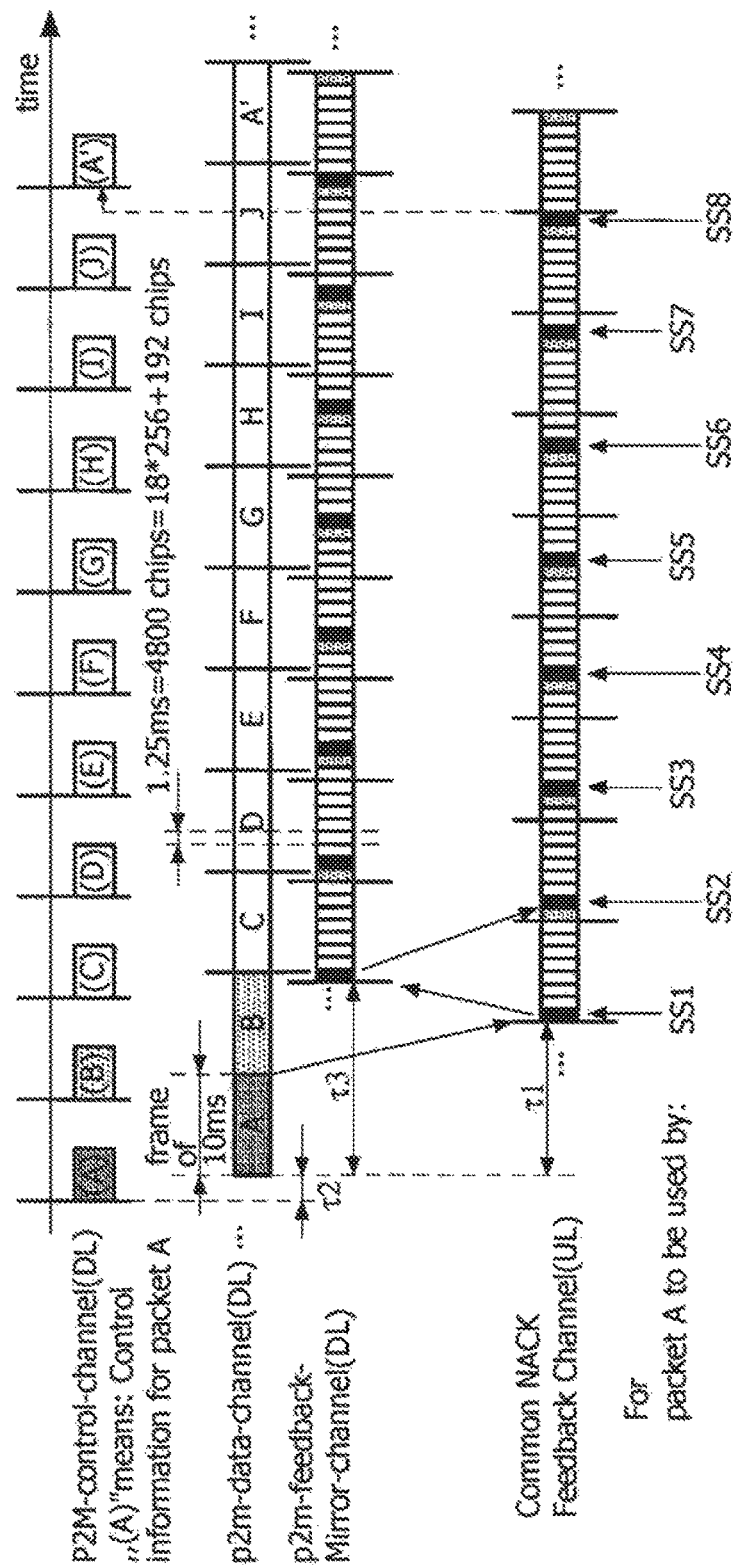
FIG. 4 shows another exemplary embodiment of a method of operating the data transmitting system depicted in FIG. 1 according to the present invention.

FIG. 4 shows details of a possible implementation of an exemplary embodiment of a method according to the present invention. The third generation partnership project, in the following referred to as "3GPP", is currently working on the design of an MBMS (Multimedia Broadcast Multicast Services) bearer service, which aims at distributing multimedia contents to UEs (ie user equipment or receiving station) in UMTS radio cells via the UMTS radio interface rather than broadcast channels of terrestrial broadcast companies. If the number of UEs that intend to receive a certain service of the MBMS (these UEs are said to have joined the service) in a radio cell is big enough, a p2m-channel is to be used, meaning that the MBMS content is sent once on a single physical resource, and received on this physical resource by all UEs in the radio cell, which have joined the service.

Using a simple broadcast channel (similar to the FACH (Forward Access Channel), which is already available in Release 99 of the UMTS) as p2m-channel for distributing the MBMS content poses the problem that a considerable portion of the transmission (TX) power to be used in the downlink in one radio cell has to be used for MBMS content distribution. A figure usually mentioned is 30% or more. In other words, this means that relatively little power remains to support other services in the radio cell, e.g. speech calls or internet access with Web downloading. Nevertheless, this is the current working assumption in 3GPP TSG RAN WG1. In order to alleviate the problem of data loss especially for UEs located at the cell edge, it is currently discussed to place a very strong FEC on top of the FACH, which uses code concatenation: transport blocks are convolutionally or turbo coded as in Release 99, and a number of coded transport blocks is then arranged under each other so that a matrix of bits results, and the bits of a column are encoded by means of a block code. This is described, for example, in R2-032157, Outer coding for MBMS, Technical document published on RAN2#38, which is hereby incorporated by reference.

A major disadvantage of this approach is the fact that there is no adaptivity of this very strong FEC: It is applied no matter whether the recipients actually need the added redundancy in order to decode the received data correctly or not. From this perspective, the approach is not very efficient.

Adaptivity would come into the play, if the well-known combining technique together with incremental redundancy retransmission schemes were used. R1-030086, Release 5+MBMS solution: HS-DSCH, Technical document published on RAN 1 #30, (in the following referred to as "R1-030086"), which is hereby incorporated by reference, analyses the potential benefit, which soft-combining and incremental redundancy (in the following referred to as "IR") could provide for MBMS content delivery, if an HS-DSCH-like transport channel (TrCH) were used. This document comes to the conclusion that adjusting the HS-DSCH for MBMS purposes results in a significant capacity increase (at least 2 dB reduction of the required transmission power compared with the FACH to satisfy the same number of users), under the assumption that there is a reasonable feedback mechanism available for carrying the ACK/NACK feedback.

If these results are representative, instead of 30% (as is usually assumed when using FACH) only 18% of a cell's DL TX power would have to be spent for MBMS content delivery, if soft-combining and IR could be applied for the TrCH for MBMS.

In addition, R1-030086 states that with 40 MBMS users, about 1% of the users need 4 or more retransmissions. Applying STTD (Space-Time Transmit Diversity) in addition, about 1% of the users need 3 or more retransmissions. For 80 MBMS users and STTD the figure is a bit worse, i.e. 1-2% of the users need 3 or more retransmissions. In addition, for all cases, the fraction of users needing only one retransmission is between 20% and 30%, and the fraction for a higher number of retransmissions decreases with the number of retransmissions, as expected.

As already stated above, the main problem of incremental redundancy retransmission schemes is the fact that they need feedback from the recipients on whether a retransmission is required or not. With the huge number of potential recipients for MBMS in a radio cell, feedback as such causes problems: If every recipients sent an ACK after correctly decoding the packet, and a NACK, if decoding failed and a retransmission is needed, as it is the case for the HS-DSCH (High Speed Downlink Shared Channel) the resulting interference in the Uplink (UL) just for this feedback signaling would be huge, and would not be justified with respect to the potential gain for the downlink capacity.

Hence, according to an exemplary embodiment of the present invention, a mirroring of the request for a retransmission to other recipients of the same data, that have not yet sent their feedback is provided, so that they refrain from sending feedback, since anyway a retransmission will occur. Among other options, it may also be possible to completely avoid recipients send ACKs, when error-free decoding of a packet is possible, and only send NACKs, if decoding of a packet failed. For this, a decomposition of the group of recipients into subsets is described, where the members of a subset are assigned an uplink slot or phase, in which they can send, for a considered packet received in the downlink, their feedback. Since different subsets have different uplink slots or phases, it is possible to mirror feedback (i.e. a NACK) received e.g. from the first subset to all remaining subsets, so that the recipients of the remaining subsets do not send a NACK, since anyway a retransmission for this packet is going to come. In other words, there are downlink phases or slots defined after each packet transmission, in which the NodeB can indicate to the recipients of the different (remaining) subsets, that it has received a NACK from an earlier subset, and hence will send a retransmission, so that the members of the remaining subsets do not send a NACK. In other words, this indication in the DL indicates to the remaining recipients that they should stop sending NACKs, i.e. it is a NACK blocking indication.

FIG. 4 depicts a schematic representation of a possible implementation of the concept of a method according to the present invention, as it would be necessary in order to apply the scheme in UMTS with little modification. In particular, the method depicted in FIG. 4 soft-combines NACKs of different subsets or groups (i.e. from different recipients) in the NodeB, where the NACKs of members of the same subset or group superimpose at the NodeB. This is in particular important, if the NACK energy e.g. sent by the recipients in subset 1 was not sufficient, i.e. NodeB did not detect a NACK, and some recipients in subset 2 also need a retransmission and therefore send a NACK. Due to the combining of the quantized amplitudes, which the NodeB has stored after receiving the NACK of subset 1 with the quantized amplitudes, resulting from the NACK sent by subset 2, there is a very high probability that—after combining—a NACK is detected in NodeB.

Furthermore, FIG. 4 shows an efficient scheme for assigning UL slots or phases to the subsets in order to minimize the amount of buffering of downlink data, which is necessary in order to allow for a continuous DL stream even if retransmissions have to be sent, and at the same time provides enough processing time for the NodeB to process the feedback received from a subset before sending a blocking indication (if any) and the recipients (UEs) to read the DL slot or phase, in which a blocking indication can be sent.

It is further explained, how power ramping can be employed at the same time. Furthermore, strategies for assigning the different recipients (UEs) to the subsets are described.

In the following a more detailed description of an exemplary embodiment of the present invention is given:

A p2m-control channel is assumed to provide the recipients at least with information about whether the packet sent in a DL frame contains new data or is a retransmission (New Data Indicator as known from the HS-DSCH)—which type of incremental redundancy is carried in the packet, if it is not a new transmission (this information can be missing, if only Chase Combining is used)

for which soft buffer the transmitted packet is addressed to. (known as the HARQ process in case of the HS-DSCH)

The packets are then sent on the p2m-data channel.

FIG. 4 shows the proposed scheme with 8 different subsets of UEs. The members of the first subset (SS1) try to decode the data packet A, and if at least one member cannot decode packet A successfully, it will send a NACK on the CNFCH (Common NACK feedback channel) in the slot assigned for SS1 with respect to packet A. The CNFCH is a channel, to which any member of a subset has access during the time slot assigned for this subset, to send a NACK, if this member needs a retransmission. Typically, a NACK may be just a repetition-coded bit, e.g. a "+1"-bit. When several members of the same subset send NACKs, these NACKs in form of repetition-coded "+1" bits superimpose at the receiving NodeB, possibly with slight mutual time shift, and this superposition would result in a stronger compound signal.

The relationship between a packet sent in the DL and the slot of the CNFCH to use for NACK transmission is pre-defined as follows (as shown in FIG. 4):

The first slot of the CNFCH in each frame refers to the packet whose transmission in the DL started by the interval of length $\tau 1$ before the considered frame of the CNFCH starts, and it can be used by the members of SS1. The second slot of the CNFCH in each frame refers to the packet whose transmission in the DL started by the interval of length T1 plus 1 frame length (here 10 ms). It can be used by the members of SS2 for the packet, to which the slot refers to. The third slot of the CNFCH in each frame refers to the packet, whose transmission in the DL started by the interval of length $\tau 1$ plus 2 frame lengths (here 2×10 ms=20 ms), and so on.

With the 8 different slots per CNFCH frame, it is possible to support 8 different UE subsets. In order to provide a continuous stream of packet transmissions, as shown in FIG. 4, it is required that the UEs be able to store N1+2 packets (N1: number of subsets, here N1=8), since in the worst case, as shown in FIG. 4, only after receiving the feedback (for packet A) of the eighth subset, NodeB knows that it should initiate a retransmission for packet A, which is denoted here as A'. It is called a retransmission for packet A, since A' can be an exact copy of A (i.e. combining would be done in the Chase Combining fashion) or A' can contain a different, self-decodable version of A (i.e. the same systematic bits, but other parity bits taken from the punctured parity bits), or A' can only carry non-self-decodable redundancy, e.g. just additional parity bits.

In theory, this number N1+2 of packets, which have to be stored, could be reduced to N1+1, if decoding of a packet went so fast that $\tau 1$-'frame length", wherein "frame length" is the interval, which is needed to transmit one packet via the downlink p2m-data-channel; in FIG. 4 this frame length is assumed to be equal to 10 ms. If the decoding time is more than one frame length, but smaller than two frame lengths, N1+3 packets will have to be stored in order to keep the stream of packet transmissions continuous.

The 8 packets A, B, . . . , J are stored as soft bits, i.e. systematic bits and parity bits quantized with e.g. 4 bits. Of course, if it is earlier clear that NodeB should send a retransmission for A, A' can be inserted earlier e.g. instead of C, if the feedback transmission of the SS1 already causes NodeB to detect a NACK. In this case, the p2m-feedback-mirror-channel would indicate to the remaining subsets (SS2, SS3, . . . , SS8) that it has detected a NACK for packet A so that no further NACKs (if any) from these subsets are required, and therefore the members of the remaining subsets are not allowed to send a NACK in order to avoid unnecessary UL interference.

The corresponding slot (relating to a transmitted packet) on the p2m-feedback-mirror-channel is also predefined in a similar manner as the slots in the CNFCH: As shown in FIG. 4, this slot is the first in the frame of the p2m-feedback-mirror-channel, which frame starts by the interval $\tau 3$ after the transmission of packet A in the DL (to which it refers) began.

Combining of NACKs of different subsets:

If some members of SS1 send NACKs (which NACKs superimpose since they are sent in the same slot) in the first slot of the CNFCH referring to packet A, which cannot be detected by NodeB, the p2m-feedback-mirror-channel would not indicate blocking of NACK transmissions for the remaining subsets. If there are members in one or more of the remaining subsets, which need a retransmission for packet A, they will then also send NACKs (which superimpose). The soft bits of the NACKs sent by some members of SS1 and the soft bits of the NACKs sent by some members of remaining subsets, can be soft-combined in the same manner, as the individual soft-bits sent in one slot: The simplest way is to compute the mean value of the soft-bits to obtain a better estimate of what was actually sent (a NACK or nothing).

Likewise, this can be applied, if no members of SS1 send a NACK, but some members of SS2 send a NACK and some members of the remaining subsets send a NACK (unless NodeB blocks transmission of NACKs, since it has already detected the NACK.

Only if only some members of the last subset (here SS8) send a NACK, no soft-combining with NACKs sent by members of other subsets is possible, since there are no remaining subsets, whose members could send a NACK.

The important new aspect in this approach is that signals of different senders are combined, while in known techniques, only signals of the same sender are combined.

Determining the NACK transmission power:

The standard approach for determining the NACK transmission power is as follows (using dB notation):

TX power (dB)=Pdetect (dB)–"observed pathloss" (dB), where "observed pathloss" is counted as negative, i.e. TX power is increased by the absolute value of "observed pathloss", i.e. the TX is given by the power, which is required for NodeB to decode the signal as a NACK, if the path loss is (nearly) 0, increased by the factor, which compensates for the path loss. This would normally cause a TX power, which suffices to detect the NACK of only one UE. In the context of the multicast transmission, the goal is to maximize the number of satisfied users while at the same time reducing the required DL TX power for transmitting the packets. Hence, it is expected that usually a retransmission is not sent, if only one UE needs a retransmission. In order to control this to some extent, it is possible to modify the above formula by introducing a further quantity N2, which represents the number of UEs, which as a minimum have to send a NACK so that a retransmission is actually initiated. Since the NACKs of the members of the same subset are transmitted in the same slot, they superimpose. If the minimum number of UEs of the same subset, which require a retransmission is N2, each of these UEs has to reduce the above TX power value by a factor of N2, so that these N2 transmissions add to a sufficiently high received power at the NodeB, to make NodeB detect a NACK. This is, however, only an approximation. It could well be that a bit more than N2 or a bit less than N2 UEs have to send a NACK so that this is actually detected at NodeB. Hence, as an approximation one gets for the required TX power so that about N2 UEs have to send a NACK so that NodeB actually detects a NACK:

TX power (dB)=Pdetect (dB)–"observed pathloss" (dB)–N2 (dB), where "observed pathloss" is counted as negative, i.e. TX power is increased by the absolute value of "observed pathloss", and TX power is decreased by the factor N2.

Assigning UEs to the different subsets:

There are different options to assign the UEs to the subset. Nevertheless it is important that the assignment is done implicitly, i.e. does not need additional signaling, especially in the MBMS context, since also UEs in idle mode should be able to receive the MBMS contents.

One way of assigning has already mentioned above: NodeB broadcasts the number N1 of subsets, which are available (in the above example 8), and each UE that wants to receive the MBMS content computes the subset number by a modulo operation applied to its IMSI: IMSI mod N1. This would usually suffice to reach an equal distribution of UEs to the subsets. Instead, it is also possible that each UE draws a random number "rand" between 0 and 1. The interval between 0 and 1 is partitioned into N1 subintervals of equal length, and they are numbered from 1 to N1. The number of the interval, to which "rand" belongs then determines the number of the subset to which the UE belongs. This technique could be extended in such a way that the count of UEs in a subset differs, which would be done by making the sub-intervals different in length. This can be helpful for keeping the interference low, if the count of members of the different subsets obeys the following relation: Count of members in SS1<Count of members in SS2<Count of members in SS3< . . . .

Due to the growing number of members of subsets, which have their slot to send the feedback later, in addition to the possibility of soft combining NACK transmissions of earlier subsets, it is made sure that if there are sufficient NACKs in earlier subsets to cause a retransmission, that no NACKs are sent by members of later subsets. Note that the relative size of the subsets can additionally be taken into account when determining the TX power for the NACK in the sense that the factor N2 is modified based on the relative size of the subsets (for a smaller subset, it could be necessary to use a reduced value (reduced relative to the relative subset size) of N2 in the formula for computing the TX power, since due to the smaller subset, the chance is lower that there are sufficient UEs that need a retransmission.

The relative member count of the subsets would preferably not be broadcast, but be made available implicitly, e.g. when the UE joins the service.

In addition, it is possible to base, at least to some extent, the assignment to the subset on the perceived path loss. The idea behind this is, that UEs with only a small path loss usually have good channel conditions, and therefore would in most cases be able to decode the packet error-free. In contrast to this UEs with a higher path loss would more often need a retransmission. Assuming that there is a partitioning of UEs into two groups, where one group collects UEs with a path loss not higher than T1, and the other group collects the remaining UEs, the following two strategies are possible: the group with UEs perceiving a path loss below T1 are assigned to the first subset, i.e. they are allowed to send their NACKs before the UEs of the other group, assigned to the second subset. Then it could already be possible to reduce the NACK transmission by members of the second group, since if NodeB detects a NACK from the first subset, there is a high likelihood that also the members of the second subset will need a retransmission, and hence they would be informed via the p2m-feedback-mirror-channel that they must not send a NACK, since a retransmission is anyway scheduled.

The second strategy would assign the UEs with higher path loss than T1 to the first subset, and the others to the second subset, since this would reduce the delay for initiating a retransmission.

In all cases, it is best to combine partitioning based on the drawing of a random number or applying the modulo-operation to the IMSI (or Temporal Mobile Subscriber Identity TMSI) with partitioning based on the perceived path loss.

This could mean in terms of the first strategy that e.g. the first 4 subsets contain UEs, that face a path loss lower than T1 (i.e. they are the UEs more "distant" from the NodeB) and the second 4 subsets contain UEs, that face a path loss not lower than T1. The parameter T1 is a network planning parameter, which could be broadcast to the UEs in a cell. Also within these 4 subsets each, it can be beneficial to make sure that the subset sizes are different.

Power Ramping:

Since there are N1 slots in the CNFCH, they can also be used for power ramping the TX power, however depending on the slot, in which a subset is allowed (or more precisely: the members of a subset are allowed) to send a NACK, the number of power ramping steps is changed: Since the first subset is followed by further N1−1 slots, in which members of other subsets can send their NACKs, these subsets can be used to send the subset feedback of the first subset with increased power. For the members of the second subset, only N1−2 further slots are available for the ramping, and so on. Only the last subset cannot power ramp. The essential benefit of power ramping lies in the fact that it helps to keep the TX power until a NACK is actually detected lower than without power ramping. Due to the fact that the number of ramping steps depend on the number of the subset, to which a UE is assigned, the best strategy may be to let the initial TX power (before ramping up) increase with increasing subset serial number.

Also it may also be possible to only use some of the slots in consecutive following CNFCH frames for repeating NACK transmission of a particular subset (of recipients) with higher TX power. This has the advantage, that there is an additional opportunity for the later subsets to convey their NACKs and for the NodeB to actually detect the NACK, before the NACK transmission of an earlier subset is repeated at higher TX power.

Amount of Soft Buffer Memory:

Applying the current frame format of the FACH (as defined in TS 25.211, 3GPP specification, which is hereby incorporated by reference) as a guideline for the number of bits, that can be carried via the p2m-data-channel, the following numbers of L1 bits have to be stored in the soft buffer:

| SF | Number of L1 bits per 10 ms frame | Bit rate (kbps) | Actual number of bits (4 bit quantisation to represent the amplitudes) per frame | Number of bit to store with N1 = 8 (i.e. N1 + 2 frames have to be stored in the worst case) |
|---|---|---|---|---|
| 256 | 300 | 30 | 1200 | 12000 |
| 128 | 600 | 60 | 2400 | 24000 |
| 64 | 1200 | 120 | 4800 | 48000 |

In principle, the packet size could be increased to a duration of 20 ms, in which case the number of soft bits to be stored increases by a factor of 2, while at the same time relaxing the timing requirement D3-D1, which is 3.75 ms in FIG. 4.

Probing to Estimate the Number of Users Sending a NACK:

If the number of UEs receiving MBMS content in one cell is very big, a retransmission protocol with feedback may be inefficient in the sense, that anyway the data has to be sent with a relatively high power to achieve an acceptably big group of satisfied users, which is only marginally increased by a retransmission mechanism. Therefore, it may be advantageous to allow the Node B to estimate the number of UEs that receive the MBMS content in a period of time by asking all these UEs to send a NACK (where each UE sets the NACK TX power based only on the pathloss). The NACK transmissions superimpose and cause a peak in the NodeB, which can be used as a rough measure for the number of UEs receiving the MBMS content.

If the number of UEs is so high that a retransmission protocol would be inefficient, the NodeB indicates via the downlink to the UEs that they must not send any NACKs or feedback messages in case they find out that they miss a packet. This indication is different from the other indication (carried on the p2m-feedback-mirror-channel) that UEs belonging to later subsets should not send a further NACK, because the NodeB is going to send a retransmission anyway. This other indication means that a retransmission for a packet will be scheduled. Hence, the indication that the recipients should not send any feedback messages cannot be sent via the p2m-feedback-mirror-channel. Instead, it could be included in the system information broadcast relevant for MBMS content delivery, and UEs have to first retrieve this system information in order to know, whether the NodeB is ready to process feedback messages or delivers MBMS content without performing retransmissions.

What is claimed is:

1. A transmission station for point-to-multipoint data transmission to a plurality of receiving stations, the transmission station comprising:
    a transmitter configured to transmit data to a plurality of first receiving stations in a point-to-multipoint transmission system;
    a receiver configured to receive a confirmation message with respect to the data from at least one second receiving station of the plurality of first receiving stations at the transmitting station, the confirmation message being at least one of:
        a negative acknowledgement message indicating that the at least one second receiving station unsuccessfully decoded the data, and
        a positive acknowledgement message indicating that the at the at least one second receiving station at least successfully decoded the data;
    the transmitter configured to re-transmit the confirmation message from the transmitting station to at least one third receiving station of the plurality of first receiving stations;
    a processor configured to:
        at least logically group the first receiving stations into at least a first and a second groups of first receiving stations on the basis of the path loss values between the transmitting station and the first receiving stations, such that each group includes at least one receiving station of the plurality of first receiving stations, and wherein the path loss value of the receiving stations of the first group is lower than the path loss value of the receiving stations of the second group;
        assign a first and a second predetermined feedback phases respectively to the first and to the second groups, wherein the second feedback phase occurs after the first feedback phase;
    the receiver configured to receive the at least one second receiving station sends the confirmation message to the transmitting station in accordance with the first or the second feedback phases when the second receiving station belongs to respectively the first or the second group;
    the transmitter configured to transmit to the at least one first receiving station of the second group, an indication that a negative acknowledgement has already been received by the transmitting station for the transmitted data; and
    the transmission to the at least one first receiving station of the second group, of the indication that the negative acknowledgement has already been received by the transmitting station for the transmitted data, suppresses reception of further negative acknowledgements.

2. The transmission station of claim 1, wherein, the transmitter is configured to retransmit the data when the confirmation message is a negative acknowledgement message.

3. The transmission station of claim 1, wherein:
    after a retransmission of the data, the receiver is configured to only receive messages from third groups of the plurality of groups which have not sent the positive acknowledgement message with respect to the data; and
    the receiver considers third groups to have sent the positive acknowledgement message when all of the receiving stations belonging to the groups have sent the positive acknowledgement message.

4. The transmission station of claim 1, wherein:
    the confirmation message is a negative acknowledgement message indicating that the at least one second receiving station could not successfully decode the data error-free; and
    the transmission station retransmits the data upon reception and decoding of the confirmation message.

5. The transmission station of claim 1, wherein the method is applied in the context of Multimedia Broadcast Multicast Services in UMTS.

6. The transmission station of claim 1, wherein the receiver is configured to:
  receive the confirmation message comprising confirmation data in a form of soft bits; and
  soft-combine the confirmation message of the at least one fourth receiving station of the first group with the confirmation message of the at least one fifth receiving station of the second group.

7. The transmitting station of claim 1, wherein:
  the receiver is configured to receive a confirmation message from at least one seventh receiving station of the plurality of first receiving stations with a first transmission power;
  when a confirmation message is received from a minimum number of seventh receiving stations in accordance with a third feedback phase in accordance with a feedback scheme, resulting in a superposition of confirmation messages and therefore in an increase of power received at the transmitting station, the received power at the transmitting station is sufficient for decoding the superposition of confirmation messages; and
  when a confirmation message is received by less than a minimum number of seventh receiving stations in accordance with the third feedback phase, the received power at the transmitting station is not sufficient for decoding the superposition of confirmation messages.

8. The transmitting station of claim 1, wherein:
  the receiver is configured to after receiving a confirmation message from at least one fourth receiving station with a second transmission power in accordance with the first feedback phase, receive a confirmation message in accordance with the second feedback phase and with a third transmission power; and
  wherein the third transmission power is higher than the second transmission power.

9. The transmitting station of claim 1,
  wherein the data is a data packet;
  wherein the transmitting station implements a retransmission protocol in a cellular radio communication system.

10. The transmitting station of claim 1, wherein the positive acknowledgement message indicates that the at the at least one second receiving station errorlessly decoded the data.

11. A receiving station for a data transmission system for point-to-multipoint data transmission from a transmitting station to a plurality of receiving stations, the receiving station comprising:
  a receiver configured to receive data sent from a transmitting station to a plurality of receiving stations;
  a transmitter configured to send a first confirmation message to the transmitting station;
  wherein the first confirmation message relates to a decoding of the received data at the receiving station;
  wherein the receiver is configured to receive a second confirmation message, sent from the transmitting station;
  wherein the second confirmation message relates to a decoding of the received data at another receiving station of the plurality of receiving stations, and the first and second confirmation messages being at least one of:
    a negative acknowledgement message indicating that the at least one second receiving station unsuccessfully decoded the received data, and
    a positive acknowledgement message indicating that the at least one second receiving station at least successfully decoded the received data;
  wherein the receiving station is configured to be at least logically grouped in at least a first and a second groups, on the basis of the path loss value between the receiving station and the transmitting station, and
  wherein the path loss value of the receiving stations of the first group is lower than the path loss value of the receiving stations of the second group, and wherein the receiving station is configured for sending the first confirmation message to the transmitting station in accordance with the first or the second feedback phases if the receiving station belongs to respectively the first or the second group;
  wherein the receiving station belongs to the second group and receives an indication that a negative acknowledgement has already been received by the transmitting station for the received data, from any other receiving station, the receiving station is configured to suppress sending a negative acknowledgement.

12. The receiving station of claim 11,
  wherein a sixth receiving station of the plurality of first receiving stations determines a fourth group of the plurality of groups of first receiving stations after receiving information about the number of groups of the first receiving stations available for grouping;
  wherein, after determination of the fourth group, the sixth receiving station considers itself to belong to the fourth group; and
  wherein the determination of the fourth group to which the sixth receiving station considers itself to belong to is performed by the sixth receiving station without additional signaling.

13. The transmitting station of claim 12,
  wherein the determination of the fourth group to which the sixth receiving station is assigned is performed on the basis of at least one of a random number generated by the sixth receiving station, a modulo operation applied to one of an IMSI and a TMSI of the sixth receiving station, and a determined path loss during the data transmission.

14. A method of operating a transmitting station for a point-to-multipoint data transmission to a plurality of first receiving stations, the method comprising the acts of:
  in a transmitting station:
    transmitting data from the transmitting station to a plurality of first receiving stations;
    receiving a confirmation message with respect to the data from at least one second receiving station of the plurality of first receiving stations, the confirmation message being at least one of:
      a negative acknowledgement message indicating that the at least one second receiving station unsuccessfully decoded the data, and
      a positive acknowledgement message indicating that the at least one second receiving station at least successfully decoded the transmitted data;
    transmitting the confirmation message to at least one third receiving station of the plurality of first receiving stations;
    at least logically grouping the first receiving stations into at least a first and a second groups of first receiving stations on the basis of the path loss values between the transmitting station and the first receiving stations, such that each group includes at least one receiving station of the plurality of first receiving stations, and wherein the path loss value of the receiving stations of the first group is lower than the path loss value of the receiving stations of the second group;

assigning a first and a second predetermined feedback phases respectively to the first and to the second groups, wherein the second feedback phase occurs after the first feedback phase;

receiving the confirmation message from the at least one second receiving station in accordance with the first or the second feedback phases when the second receiving station belongs to respectively the first or the second group, transmitting to at least one first receiving station of the second group, an indication that a negative acknowledgement has already been received by the transmitting station for the transmitted data, to suppresses receiving a negative acknowledgement.

15. A method of operating a receiving station for a data transmission system for point-to-multipoint data transmission from a transmitting station to a plurality of receiving stations, the method comprising the acts of:

in a receiving station:
receiving data via a receiver, from a transmitting station sending the data to a plurality of receiving stations;
sending a message via a transmitter, including a first confirmation message sent to the transmitting station;
wherein the first confirmation message relates to a decoding of the received data at the receiving station;
receiving via the receiver, a second confirmation message sent from the transmitting station;
wherein the second confirmation message relates to a decoding of the received data at another receiving station of the plurality of receiving stations, and the first and second confirmation messages being at least one of:

a negative acknowledgement message indicating that the at least one second receiving station unsuccessfully decoded the received data, and
a positive acknowledgement message indicating that the at least one second receiving station at least successfully decoded the received data;

wherein the receiving station is configured to be at least logically grouped in at least a first and a second groups, on the basis of the path loss value between the receiving station and the transmitting station, and wherein the path loss value of the receiving stations of the first group is lower than the path loss value of the receiving stations of the second group, and wherein the first confirmation message is sent to the transmitting station in accordance with the first or the second feedback phases when the receiving station belongs to respectively the first or the second group;

when the receiving station belongs to the second group and receives an indication that a negative acknowledgement has already been received by the transmitting station for the received data, from any other receiving station, the receiving station is configured to suppress sending a negative acknowledgement.

16. A computer-readable storage-medium that is not a transitory propagating signal or wave, the medium comprising control information including instructions for a method of operating a transmitting station for a point-to-multipoint data transmission to a plurality of receiving stations, the method comprising the acts of claim 14.

17. A computer-readable storage-medium that is not a transitory propagating signal or wave, the medium comprising control information including instructions for a method of operating a receiving station for receiving a point-to-multipoint data transmission from a transmitting station to a plurality of receiving stations, the method comprising the acts of claim 15.

* * * * *